US008619720B2

(12) United States Patent
Chen et al.

(10) Patent No.: US 8,619,720 B2
(45) Date of Patent: *Dec. 31, 2013

(54) METHOD AND APPARATUS FOR POWER CONTROL OF MULTIPLE CHANNELS IN A WIRELESS COMMUNICATION SYSTEM

(75) Inventors: Tao Chen, San Diego, CA (US); Yu-Cheun Jou, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 430 days.

This patent is subject to a terminal disclaimer.

(21) Appl. No.: 12/550,252

(22) Filed: Aug. 28, 2009

(65) Prior Publication Data
US 2010/0046481 A1 Feb. 25, 2010

Related U.S. Application Data

(63) Continuation of application No. 09/755,659, filed on Jan. 5, 2001, now Pat. No. 7,590,095.

(60) Provisional application No. 60/182,322, filed on Feb. 14, 2000.

(51) Int. Cl.
*H04B 7/216* (2006.01)

(52) U.S. Cl.
USPC .......................................... 370/335; 455/522

(58) Field of Classification Search
USPC ............ 370/311, 335, 337, 342, 347; 455/69, 455/522
See application file for complete search history.

(56) References Cited

U.S. PATENT DOCUMENTS

| 5,056,109 A | 10/1991 | Gilhousen |
| 5,265,119 A | 11/1993 | Gilhousen |
| 5,590,873 A | 1/1997 | Smart et al. |

(Continued)

FOREIGN PATENT DOCUMENTS

| CA | 2313167 | 1/2001 |
| EP | 1009107 | 6/2000 |

(Continued)

OTHER PUBLICATIONS

International Search Report—PCT/US01/004844—International Search Authority—European Patent Office—Jun. 22, 2001.

(Continued)

*Primary Examiner* — Ricky Ngo
*Assistant Examiner* — Christine Ng
(74) *Attorney, Agent, or Firm* — Rupit M. Patel

(57) ABSTRACT

Techniques to control the transmit power of multiple transmissions in a wireless communication system. A transmitting source (e.g., a base station) receives from a receiving device (e.g., a remote terminal) a number of feedbacks of one or more (coded or uncoded) bit streams and possibly one or more messages. The bit stream may include one or more power control sub-channels used to send one or more metrics (e.g., power control commands, erasure indicator bits, or quality indicator bits) for one or more sets of channels. The bits allocated for each sub-channel may be aggregated to form one or more lower rate feedback sub-streams having improved reliability. The transmit power of two or more channels can be (1) independently adjusted based on the feedbacks from respective sub-channels, or (2) adjusted together based on feedback from one sub-channel, with the power difference being adjusted based on feedback received another sub-channel.

25 Claims, 9 Drawing Sheets

(56) References Cited

U.S. PATENT DOCUMENTS

| | | | |
|---|---|---|---|
| 5,649,000 | A | 7/1997 | Lee et al. |
| 5,963,870 | A | 10/1999 | Chheda et al. |
| 5,991,329 | A | 11/1999 | Lomp et al. |
| 6,058,107 | A | 5/2000 | Love et al. |
| 6,064,663 | A | 5/2000 | Honkasalo et al. |
| 6,148,208 | A * | 11/2000 | Love ............... 455/442 |
| 6,233,439 | B1 * | 5/2001 | Jalali ............... 455/127.2 |
| 6,249,683 | B1 * | 6/2001 | Lundby et al. ............... 455/522 |
| 6,256,476 | B1 | 7/2001 | Beamish et al. |
| 6,259,927 | B1 * | 7/2001 | Butovitsch et al. ............... 455/522 |
| 6,337,989 | B1 * | 1/2002 | Agin ............... 455/522 |
| 6,493,326 | B1 | 12/2002 | Ramachandran |
| 6,498,785 | B1 * | 12/2002 | Derryberry et al. ............... 370/311 |
| 6,515,975 | B1 | 2/2003 | Cheda et al. |
| 6,539,008 | B1 * | 3/2003 | Ahn et al. ............... 370/342 |
| 6,545,986 | B1 | 4/2003 | Stellakis |
| 6,574,211 | B2 | 6/2003 | Padovani et al. |
| 6,590,873 | B1 * | 7/2003 | Li et al. ............... 370/318 |
| 6,621,809 | B1 | 9/2003 | Lee et al. |
| 6,671,266 | B1 | 12/2003 | Moon et al. |
| 6,745,044 | B1 | 6/2004 | Holtzman |
| 7,590,095 | B2 * | 9/2009 | Chen et al. ............... 370/335 |

FOREIGN PATENT DOCUMENTS

| | | |
|---|---|---|
| EP | 1067704 | 1/2001 |
| GB | 2300546 | 11/1996 |
| WO | WO9836606 | 8/1998 |
| WO | 9858461 | 12/1998 |
| WO | 9909779 A1 | 2/1999 |

OTHER PUBLICATIONS

Lee et al., "Performance of Closed-Loop Power Control for a Multiple-Channel Mobile Station in the cdma2000 System", Wireless Communications and Networking Conference, 1999, vol. 2, Sep. 21-24, 1999, p. 908-912.

TIA/EIA/IS-98-C—"Recommended Minimum Performance Standards for Dual-Mode Spread Spectrum Mobile Stations," C.S0011-0 v1.0, Approved Dec. 1999 Pub. Nov. 1999.

3GPP TS 25.211—Universal Mobile Telecommunications System (UMTS), "Physical channels and mapping of transport channels onto physical channels (FDD)", v. 3.5.0. Release 99, (Dec. 2000).

3GPP TS 25.212—Universal Mobile Telecommunications System (UMTS), "Multiplexing and channel coding (FDD)", v3.5.0, Release 99, (Dec. 2000).

3GPP TS 25.213—Universal Mobil Telecommunications System (UMTS), "Spreading and modulation (FDD)", v.3.4.0, Release 99, (Dec. 2000).

3GPP TS 25.214—Universal Mobile Telecommunications System (UMTS), "Physical layer procedures (FDD)", v3.5.0, Release 99, (Dec. 2000).

TIA/EIA/IS-2000.2, "Physical Layer Standard for cdma2000 Spread Spectrum Systems", 3GPP2 C.S0002-0 v1.0, Release 0, Published Aug. 1999.

3GPP: "3GTS 25.214 v.3.1.0 Technical Specification Group Radio Access Netowrk; Physical Layer Procedures (FDD)" [Online] Dec. 1, 1999, pp. 1-40, XP002581108 Retrieved from the Internet: URL:http://www.3gpp.org/ftp/Specs/archive/25_series/25.214/25214-310.zip> [retrieved on May 31, 2010.

European Search Report—EP07015171—Search Authority—Munich—May 5, 2010.

3G TS 25.214 V3.1.1 (Dec. 1999) 3rd Generation Partnership Proiect; Technical Specification Group Radio Access Network; Physical layer procedures (FDD) (3G TS 25.214 v3.1.0) 3GPP-Standards, 2500 Wilson Boulevard, Suite 300, Arlington, Virginia 22201 USA, Dec. 1, 1999, XP040280804.

"Digital cellular telecommunications system (Phase 2+), Radio subsystem link control (GSM 05.08 version 8.2.1 Release 1999) Available SMG ony", 3GPP Standard; Draft GSM 05.08, 3rd Generation Partnership Project (3GPP). Mobile Competence Centre ; 650, Route Des Lucioles ; F-06921 Sophia-Antipolis Cedex ; France, No. V8.2.1, Dec. 1, 1999, pp. 1-67, XP050358937.

European Search Report—EP10011030—Search Authority—Munich—Jul. 13, 2012.

Partial European Search Report—EP10011030—Search Authority—Munich—Apr. 20, 2012.

* cited by examiner

METHOD AND APPARATUS FOR POWER CONTROL OF MULTIPLE CHANNELS IN A WIRELESS COMMUNICATION SYSTEM

CROSS REFERENCE

The present application for patent is a Continuation of U.S. patent application Ser. No. 09/755,659, filed Jan. 5, 2001, entitled "METHOD AND APPARATUS FOR POWER CONTROL OF MULTIPLE CHANNELS IN A WIRELESS COMMUNICATION SYSTEM" which claims priority to Provisional Application Ser. No. 60/182,322, filed Feb. 14, 2000, entitled "New Forward Power Control Modes," assigned to the assignee hereof and hereby expressly incorporated by reference herein.

BACKGROUND OF THE INVENTION

I. Field of the Invention

The present invention relates to data communication. More particularly, the present invention relates to novel and improved techniques for controlling transmit power of multiple channels in a wireless communication system.

II. Description of the Related Art

In a wireless communication system, a user with a remote terminal (e.g., a cellular phone) communicates with another user through transmissions on the forward and reverse links via one or more base stations. The forward link refers to transmission from the base station to the remote terminal, and the reverse link refers to transmission from the remote terminal to the base station. The forward and reverse links are typically allocated different frequencies.

In a Code Division Multiple Access (CDMA) system, the total transmit power from a base station is typically indicative of the total capacity of the forward link since data may be transmitted to a number of users concurrently over the same frequency band. A portion of the total transmit power is allocated to each active user such that the total aggregate transmit power for all users is less than or equal to the total available transmit power.

To maximize the forward link capacity, the transmit power to each remote terminal may be controlled by a power control loop such that the signal quality, as measured by the energy-per-bit-to-noise-plus-interference ratio, $E_b/(N_o+I_o)$, of the signal received at the remote terminal is maintained at a particular threshold or level. This level is often referred to as the power control setpoint (or simply, the setpoint). A second power control loop may be employed to adjust the setpoint such that a desired level of performance, as measured by the frame error rate (FER), is maintained. The forward link power control mechanism thus attempts to reduce power consumption and interference while maintaining the desired link performance. This results in increased system capacity and reduced delays in serving users.

In some newer generation CDMA systems, to support high-speed data transmission, multiple channels may be concurrently used to transmit larger amount of data. These channels may be used to transmit data at different data rates, and may further utilize different processing (e.g., encoding) schemes. Typically, a particular maximum bit rate (e.g., 800 bps) is allocated to each remote terminal for power control of a number of channels. This allocated bit rate would then be used to transmit the measured signal qualities of the transmissions received on multiple channels to provide power control of the channels. The power control becomes more challenging when the operating parameters (e.g., data rate, required energy per bit, and so on) on these channels are not related by defined relationships.

As can be seen, techniques that can be used to effectively control the transmit power of multiple channels based on a given bit rate are highly desirable.

SUMMARY OF THE INVENTION

The present invention provides power control techniques to effectively control the transmit power of multiple transmissions in a wireless communication system. In accordance with one aspect, a transmitting source (e.g., a base station) receives a number of feedbacks from a receiving device (e.g., a remote terminal) for power control of multiple transmissions from the transmitting source. The feedback may comprise, for example, one or more (coded or uncoded) bit streams, one or more types of multi-bit messages, or a combination thereof. The bit stream may include a primary power control sub-channel used to send a first metric (e.g., power control command, erasure indicator bit, or quality indicator bit) for a first set of channels (e.g., a fundamental channel), and a secondary power control sub-channel used to send a second metric for a second set of channels (e.g., a supplemental channel). Various power control modes are described herein, with each mode defining a particular metric being sent for each supported power control sub-channel.

The bits allocated for each power control sub-channel may be aggregated to form one or more lower rate feedback sub-streams having improved reliability. Each sub-stream may be used to send a particular metric or be allocated for a particular channel.

Various power control mechanisms are also described herein. In one set of power control mechanisms, the transmit power of each of the fundamental and supplemental channels is independently adjusted based on the feedbacks received from respective power control sub-channels. In another set of power control mechanisms (i.e., delta power control), the transmit power of the fundamental and supplemental channels is adjusted together based on the feedback received from one power control sub-channel, and the power difference between the two channels is adjusted based on the feedback received from the other power control sub-channel or via messaging.

The invention further provides methods, power control units, and other elements that implement various aspects and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
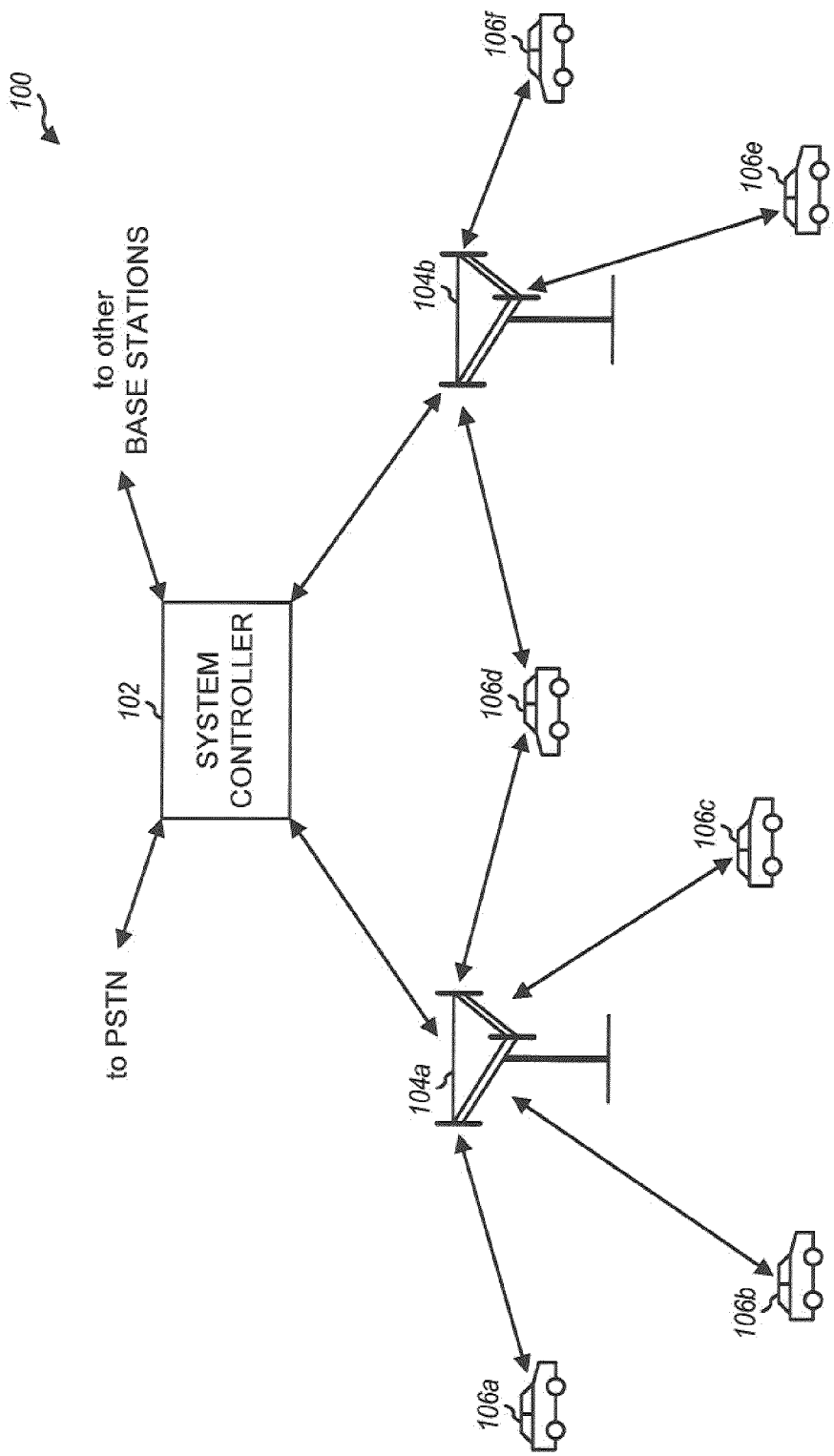
FIG. 1 is a diagram of a spread spectrum communication system that supports a number of users.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 can communicate with one or more base stations 104 on the forward and reverse links at any particular moment, depending on whether the remote terminal is active and whether it is in soft handoff. As shown in FIG. 1, base station 104a communicates with remote terminals 106a, 106b, 106c, and 106d and base station 104b communicates with remote terminals 106d, 106e, and 106f.

In system 100, a system controller 102 couples to base stations 104 and may further couple to a public switched telephone network (PSTN). System controller 102 provides coordination and control for the base stations coupled to it. System controller 102 further controls the routing of telephone calls among remote terminals 106, and between remote terminals 106 and the users coupled to PSTN (e.g., conventional telephones), via base stations 104. For a CDMA system, system controller 102 is also referred to as a base station controller (BSC).

System 100 may be designed to support one or more CDMA standards such as the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), the "TR-45.5 Physical Layer Standard for cdma2000 Spread Spectrum Systems" (the cdma2000 standard), or some other standards. Alternatively or additionally, system 100 may be designed to conform to a particular CDMA implementation such as the HDR design described in U.S. patent application Ser. No. 08/963, 386. These standards and designs are incorporated herein by reference.

For some newer generation CDMA systems capable of concurrently supporting voice and data, the communication between a particular remote terminal and one or more base stations may be achieved via a number of channels. For example, for the cdma2000 system, a fundamental channel may be assigned for voice and certain types of data, and one or more supplemental channels may be assigned for high-speed data.

As noted above, on the forward link, the capacity of each base station is limited by the total available transmit power. To provide the desired level of performance and to increase system capacity, the transmit power of the transmissions from the base station may be controlled to be as low as possible to reduce power consumption while still maintaining a desired level of performance for the transmissions. If the received signal quality at the remote terminal is too poor, the likelihood of correctly decoding the received transmission decreases and performance may be compromised (e.g., higher FER). On the other hand, if the received signal quality is too high, the transmit power level is also likely to be too high and excessive amount of transmit power is used for the transmission, which reduces capacity and may further cause extra interference to transmissions from other base stations.

For CDMA systems capable of transmitting on a number of channels (e.g., two) to a particular remote terminal, improved performance may be achieved if the transmit power of the transmission on each channel is controlled. However, to minimize the amount of signaling on the reverse link to support forward link power control, only a limited bit rate (e.g., 800 bps) is typically allocated for power control of multiple forward channels.

The power control techniques of the invention can be used for various wireless communication systems that utilize multiple channels to transmit to a particular receiving device. For example, the power control techniques described herein can be used for CDMA systems that conform to the W-CDMA standard, the cdma2000 standard, some other standard, or a combination thereof. For clarity, various aspects of the invention are described below for a specific implementation in a cdma2000 system.

Figure 2:
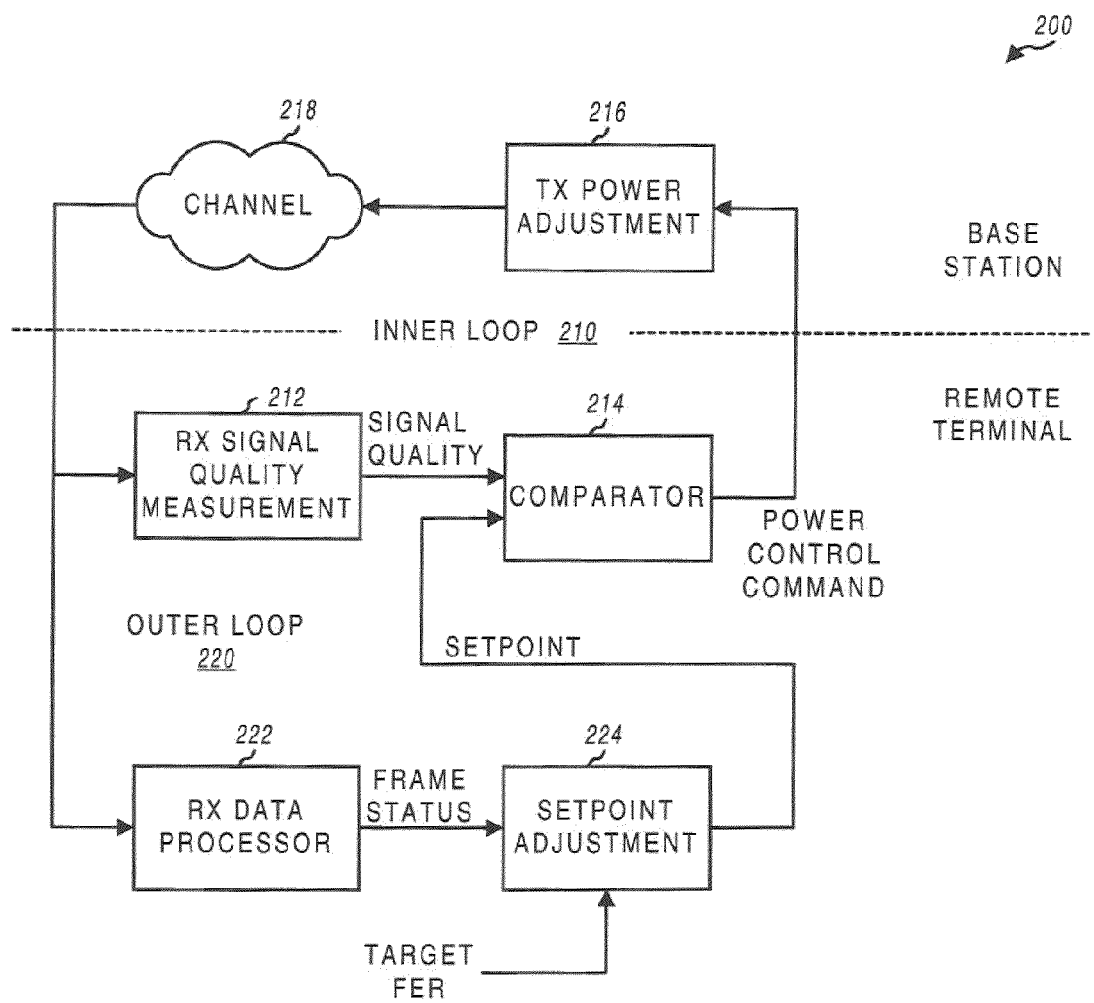
FIG. 2 is a diagram of a forward link power control mechanism that implements some aspects of the invention.

FIG. 2 is a diagram of a forward link power control mechanism 200 that implements some aspects of the invention. Power control mechanism 200 includes an inner loop power control 210 that operates in conjunction with an outer loop power control 220.

Inner loop 210 is a (relatively) fast loop that attempts to maintain the signal quality of a transmission received at the remote terminal as close as possible to a particular power control setpoint (or simply setpoint). As shown in FIG. 2, inner loop 210 operates between the remote terminal and base station. The power adjustment for inner loop 210 is typically achieved by measuring the quality of a transmission received on a particular channel at the remote terminal (block 212), comparing the measured signal quality against the setpoint (block 214), and sending a power control command to the base station.

The power control command directs the base station to adjust its transmit power and may be implemented, for example, as either an "UP" command to direct an increase in the transmit power or a "DOWN" command to direct a decrease in the transmit power. The base station then adjusts the transmit power of the transmission accordingly (block 216) each time it receives the power control command. For the cdma2000 system, the power control command may be sent as often as 800 times per second, thus providing a relatively fast response time for inner loop 210.

Due to path loss in the communication channel (cloud 218) that typically varies over time, especially for a mobile remote terminal, the received signal quality at the remote terminal continually fluctuates. Inner loop 210 thus attempts to maintain the received signal quality at or near the setpoint in the presence of changes in the channel.

Outer loop 220 is a (relatively) slower loop that continually adjusts the setpoint such that a particular level of performance is achieved for the transmission to the remote terminal. The desired level of performance is typically a particular target frame error rate (FER), which is 1% for some CDMA systems, although some other performance target can also be used. Alternatively, some other performance criteria can also be used, such as a quality indicator.

For outer loop 220, the transmission from the base station is received and processed to recover the transmitted frames and the status of the received frames is then determined (block 222). For each received frame, a determination is made whether the frame was received correctly (good) or in error (bad). Based on the status of the received frame (either good or bad), the setpoint may be adjusted accordingly (block 224). Typically, if a frame is received correctly, the received signal quality from the remote terminal is likely to be higher than necessary. The setpoint may thus be reduced slightly, which may cause inner loop 210 to reduce the transmit power of the transmission. Alternatively, if a frame is received in error, the received signal quality at the remote terminal is likely to be lower than necessary. The setpoint may thus be increased, which may cause inner loop 210 to increase the transmit power of the transmission.

The setpoint can be adjusted for each frame period. The frame status can also be accumulated for N received frames and used to adjust the setpoint every $N^{th}$ frame period, where N can be any integer greater than one. Since inner loop 210 is typically adjusted many times each frame period, inner loop 210 has a faster response time than outer loop 220.

By controlling the manner in which the setpoint is adjusted, different power control characteristics and system performance can be obtained. For example, the received FER can be adjusted by changing the amount of upward adjustment in the setpoint for a bad frame, the amount of downward adjustment for a good frame, the required elapsed time between successive increases in the setpoint, and so on. In an implementation, a target FER for each state can be set as $\Delta U/(\Delta D+\Delta U)$, where $\Delta U$ is the amount of increase in the transmit power when an UP command is received at the base station, and $\Delta D$ is the amount of decrease in the transmit power when a DOWN command is received.

In accordance with an aspect of the invention, a transmitting source (e.g., a base station) receives a number of feedbacks from a receiving device (e.g., a remote terminal) for power control of multiple transmissions from the transmitting device. The feedback may comprise, for example, one or more bit streams without forward error correction (FEC), one or more FEC-protected bit streams, one or more types of multi-bit messages (with or without FEC), or a combination thereof. The transmitting source then adjusts the transmit power of the transmissions on the multiple channels based on the received feedback.

As an example, the feedback from the receiving device can comprise an uncoded bit stream as well as a number of different coded messages. The bit stream may further comprise one or more sub-streams depending on, for example, a particular one of a number of supported power control modes, as described in further detail below.

In an embodiment, the bit stream includes a primary power control sub-channel and a secondary power control sub-channel. The primary power control sub-channel may be used to send power control information for a first set of channels, e.g., a Forward Fundamental Channel (F-FCH) or a Forward Dedicated Control Channel (F-DCCH) in the cdma2000 system. The secondary power control sub-channel may be used to send power control information for a second set of channels, e.g., a Forward Supplemental Channel (F-SCH) in the cdma2000 system.

In one aspect, the total bit rate for the bit stream is limited (e.g., to 800 bps), and can be allocated between the primary and secondary power control sub-channels in a number of ways. For example, the primary power control sub-channel can be transmitted at 800, 400, or 200 bps. Correspondingly, the secondary power control sub-channel can be transmitted at 0, 400, or 600 bps. Each of the primary and secondary power control sub-channels can be operated to send power control commands that direct the transmission source to adjust the transmit power of the corresponding transmission either up or down by a particular step.

In another aspect, the allocated bits for each power control sub-channel can be aggregated to form a more reliable, lower rate sub-stream. For example, the 400 bps power control sub-stream may be grouped into a 50 bps power control sub-stream. This lower rate sub-stream may be used to send, for example, erasure indicator bit (EIB) or quality indicator bit (QIB) of frames on the channel associated with the power control sub-stream. The lower rate sub-stream is transmitted in parallel with the other power control sub-stream.

Thus, as described in further detail below, the power control information can be sent from the receiving device back to the transmission source in various ways. The power control information can then be used to adjust the transmit power of multiple channels based on various power control mechanisms, again as described in further detail below.

Figure 3A:
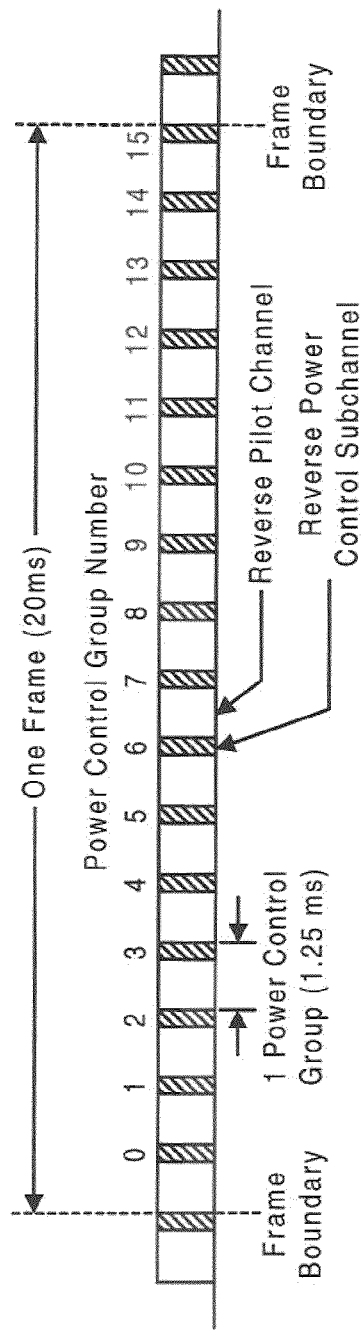
FIG. 3A is a diagram of a reverse power control sub-channel defined by the cdma2000 standard.

FIG. 3A is a diagram of a reverse power control sub-channel defined by the cdma2000 standard. As shown in FIG. 3A, the power control sub-channel is time division multiplexed with a reverse pilot channel. The transmission on this multiplexed channel is partitioned into (e.g., 20 msec) frames, with each frame being further partitioned into (e.g., 16) power control groups. For each power control group, pilot data is transmitted in the first three quarters of the power control group and power control data is transmitted in the last quarter of the power control group. The power control groups for each frame are numbered from 0 through 15.

Table 1 lists a number of power control modes in accordance with a specific embodiment of the invention. In this embodiment, the power control sub-channel is divided into a primary power control sub-channel and a secondary power control sub-channel. Each defined power control mode corresponds to a particular configuration of the primary and secondary power control sub-channels and their specific operation, as described in further detail below.

TABLE 1

| Operating Mode FPC_MODE | Power Control Sub-channel Allocations (Power Control Groups 0-15) | | | |
|---|---|---|---|---|
| | Primary Power Control Sub-channel | | Secondary Power Control Sub-channel | |
| '000' | 0, 1, 2, 3, 4, 5, 6, 7, 8, 9, 10, 11, 12, 13, 14, 15 | PC | Not supported | |
| '001' | 0, 2, 4, 6, 8, 10, 12, 14 | PC | 1, 3, 5, 7, 9, 11, 13, 15 | PC |

TABLE 1-continued

| Operating Mode FPC_MODE | Power Control Sub-channel Allocations (Power Control Groups 0-15) | | | |
|---|---|---|---|---|
| | Primary Power Control Sub-channel | | Secondary Power Control Sub-channel | |
| '010' | 1, 5, 9, 13 | PC | 0, 2, 3, 4, 6, 7, 8, 10, 11, 12, 14, 15 | PC |
| '011' | 0, 1, 2, 3, 4, 5, 6, 7, 8, 9, 10, 11, 12, 13, 14, 15 | EIB | Not supported | |
| '100' | 0, 1, 2, 3, 4, 5, 6, 7, 8, 9, 10, 11, 12, 13, 14, 15 | QIB | Not supported | |
| '101' | 0, 2, 4, 6, 8, 10, 12, 14 | QIB | 1, 3, 5, 7, 9, 11, 13, 15 | EIB |
| '110' | 0, 2, 4, 6, 8, 10, 12, 14 | PC | 1, 3, 5, 7, 9, 11, 13, 15 | EIB |
| '111' | Reserved | | Reserved | |

PC = power control command, EIB = erasure indicator bit, and QIB = quality indicator bit.

The power control data can be transmitted in various manners. In an embodiment, when a gated transmission mode is disabled, the mobile station transmits power control data on the power control sub-channel in every power control group, as shown in FIG. 3A. And when the gated transmission mode is enabled, the remote terminal transmits on the power control sub-channel only in power control groups that are gated on.

Figure 3B:
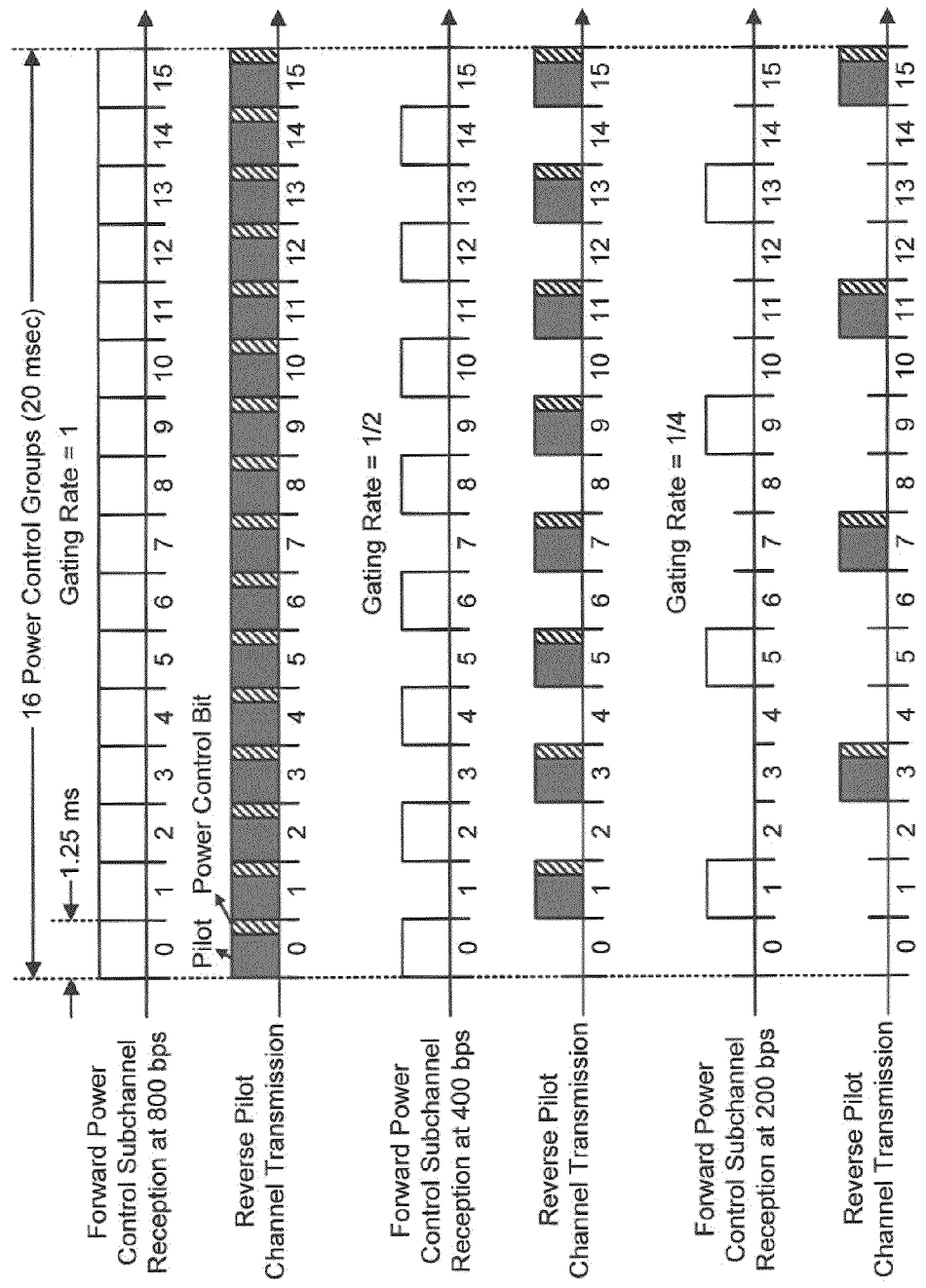
FIG. 3B is a diagram of various gated transmission modes for the reverse power control sub-channel defined by the cdma2000 standard.

FIG. 3B is a diagram of various gated transmission modes defined by the cdma2000 standard. If the pilot channel is in gated mode, the remote terminal transmits one power control sub-channel, and thus supports FPC_MODE='000', '011', or '100'. And if the pilot channel is not gated, one or two power control sub-channels may be supported. Specifically, the remote terminal transmits one power control sub-channel when FPC_MODE='000', '011', or '100', and transmits two power control sub-channels when FPC_MODE='001', '010', '101', or '110' to support a supplemental channel.

A short description for each of the power control modes listed in Table 1 is now described.

When FPC_MODE='000', the remote terminal transmits power control information only on the primary power control sub-channel at 800 bps. The power control data is typically derived from the F-FCH or the F-DCCH, as determined by a parameter FPC_PRI_CHAN. For example, FPC_PRI_CHAN='0' may indicate that the power control data is derived from the F-FCH, and FPC_PRI_CHAN='1' may indicate that the power control data is derived from the F-DCCH. Alternatively, the power control data may be derived from an F-SCH designated by a parameter FPC_SEC_CHAN. For example, FPC_SEC_CHAN='0' may indicate that the power control data is derived from the first F-SCH, and FPC_SEC_CHAN='1' may indicate that the power control data is derived from the second F-SCH.

When FPC_MODE='001', the remote terminal transmits on the primary power control sub-channel at 400 bps and on the secondary power control sub-channel at 400 bps. The transmission on the primary power control sub-channel can be via the even-numbered power control groups, and the transmission on the secondary power control sub-channel can be via the odd-numbered power control groups, as shown in Table 1.

When FPC_MODE='010', the remote terminal transmits on the primary power control sub-channel at 200 bps and on the secondary power control sub-channel at 600 bps. The transmissions for these sub-channels can be via the power control groups defined in Table 1.

When FPC_MODE='011', the remote terminal transmits erasure indicator bits (EIBs) on the power control sub-channel. The remote terminal processes the transmission on a forward channel (e.g., the F-FCH, F-DCCH, or F-SCH), determines whether frame i was received in error, and transmits in frame i+2 an erasure indicator bit indicating whether data frame i was received in error (i.e., the remote terminal transmits on the second 20 msec frame of the reverse traffic channel following the corresponding forward traffic channel frame in which the quality indicator bit or erasure indicator bit is determined, as described below).

When FPC_MODE='100', the remote terminal transmits the quality indicator bits (QIBs) on the power control sub-channel. QIBs are similar to EIBs if frames are detected, but are not all "up" if frames are not detected, as EIBs would be. Thus, if the base station does not have any frames to transmit on the forward link (i.e., except for the power control sub-channel, there is no traffic channel for the remote terminal), then the remote terminal detecting the absence of the frame (and thus frame erasures) would measure the power control sub-channel (i.e., the SNR or some other metrics derived from the sub-channel) to determine whether to transmit the QIB as "up" or "down". An up indicates that the current transmit level of the power control sub-channel for the remote terminal is inadequate, and a down indicates that it is adequate. The remote terminal processes the transmission on a forward channel, determines whether frame i was received in error or was not sent at all, and transmits in frame i+2 a QIB indicating whether data frame i was received in error or the current transmit level of the power control sub-channel for the remote terminal is adequate.

When FPC_MODE='101', the remote terminal transmits the quality indicator bit derived from either the F-FCH or F-DCCH or their associated power control sub-channel on the primary power control sub-channel. The remote terminal also transmits the erasure indicator bit derived from a designated F-SCH on the secondary power control sub-channel. The quality indicator bit and erasure indicator bit are transmitted in frame i+2 for received data frame i, as described below.

FPC_MODE='101' is useful when the base station does not have enough power headroom to dynamically respond to a faster power control feedback from the mobile station. This mode is also effective when the F-SCH is transmitted with a reduced active set (i.e., the F-SCH is transmitted by a subset of sectors that transmits the F-FCH or F-DCCH).

When FPC_MODE='110', the remote terminal transmits on the primary power control sub-channel at 400 bps, and transmits the erasure indicator bit derived from a designated F-SCH on the secondary power control sub-channel. The erasure indicator bit is transmitted in frame i+2 for received data frame i, as described below.

FPC_MODE='110' allows for independent power control of the F-FCH (or F-DCCH) and the F-SCH. The transmit power of the two channels can be independently adjusted by the feedbacks on the respective power control sub-channels. Mode '110' further supports a delta power control mechanism whereby the transmit power of both channels is adjusted together based on one power control sub-channel and the difference in transmit power levels is adjusted by the other power control sub-channel, as described in further detail below. With mode '110', the base station gains faster feedback on the true quality of the F-SCH without incurring additional signaling load. This knowledge also helps to reduce the retransmission delays for data applications.

When FPC_MODE='011' or '100', the 16 power control bits on the primary power control sub-channel are all set to the erasure indicator bit or the quality indicator bit, respectively. This provides an effective feedback rate of 50 bps. When FPC_MODE is equal to '101' or '110', the power control bits on the secondary power control sub-channel are all set to the erasure indicator bit, and the effective feedback is 50 bps for 20 msec frames, 25 bps for 40 msec frames, and 12.5 bps for 80 msec frames. And when FPC_MODE is equal to '101', the power control bits in the primary power control sub-channel are all set to the quality indicator bit, so the effective feedback is 50 bps.

Table 1 lists a specific implementation of various power control modes that may be implemented for a CDMA system that supports concurrent transmissions on multiple channels. Different and/or other power control modes can also be defined and are within the scope of the invention. Also, a power control mode may be defined to include two or more types of feedbacks, and/or to include feedback from one or more forward channels. Also, metrics other than power control commands, erasure indicator bit, and quality indicator bit can also be sent on the power control sub-channels, and this is within the scope of the invention. For example, the receiving device (e.g., remote terminal) may (1) periodically send erasure information regarding the performance of a channel over a time window together with power control commands on another channel, or (2) send a quantity related to the amount of correction the transmitting source (e.g., base station) should make to achieve the desired received signal to noise ratio.

Figure 4A:
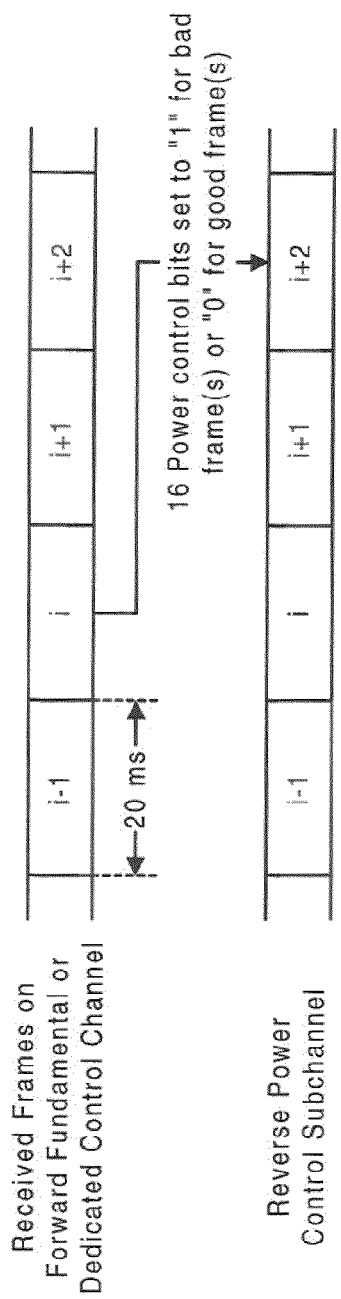
FIGS. 4A and 4B are timing diagrams for the transmissions of an erasure indicator bit on a power control sub-channel based on a frame received on the fundamental channel or dedicated control channel (FIG. 4A) and the supplemental channel (FIG. 4B)

FIG. 4A is a timing diagram for transmission of an erasure indicator bit on a power control sub-channel based on a frame received on the F-FCH or F-DCCH. The received frame i is processed and a determination is made whether the frame was received correctly or in error. The 16 power control bits for frame i+2 on the power control sub-channel are set to "1" if the received frame was bad and to "0" if the received frame was good.

The quality indicator bit sent when FPC_MODE is equal to '100' or '101' can be defined in various manners. In an embodiment, if FPC_MODE='100' and the channel configuration selects the F-FCH (instead of the F-DCCH), the remote terminal sets the power control bits on the power control sub-channel during a 20 msec period to the quality indicator bit, which is defined in the same manner as when FPC_MODE='011'. In an embodiment, if FPC_MODE='100' and the channel configuration does not select the F-FCH, the remote terminal sets the power control bits on the power control sub-channel during a 20 msec period to the quality indicator bit defined as follows:

The remote terminal sets the quality indicator bit to '1' in the second transmitted frame following reception of a 20 msec period with insufficient signal quality (e.g., bad frame) on the F-DCCH, as shown in FIG. 4A.

The remote terminal sets the quality indicator bit to '0' in the second transmitted frame following reception of a 20 msec period with sufficient signal quality (e.g., good frame) on the F-DCCH, as shown in FIG. 4A.

Figure 4B:
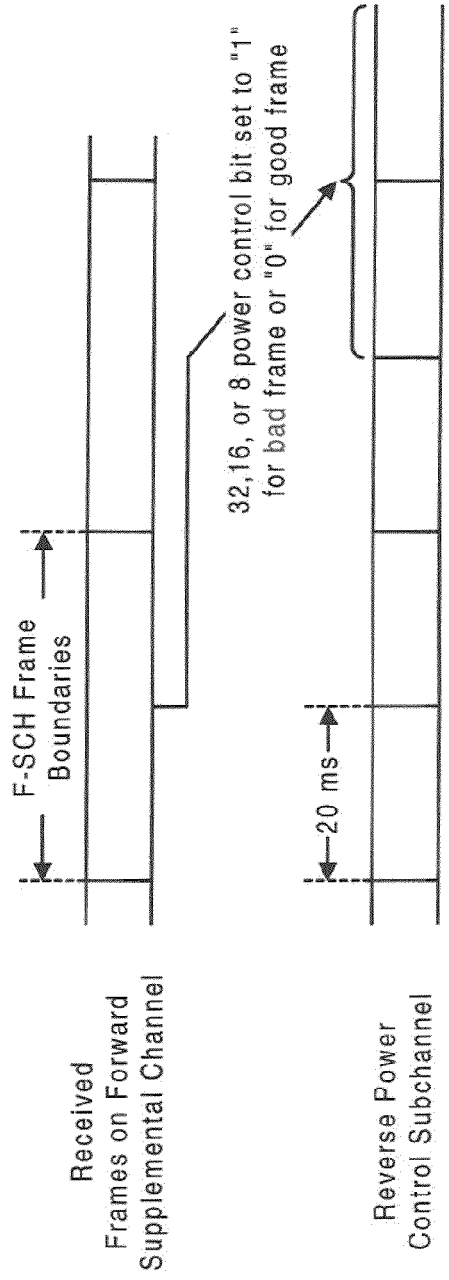

FIG. 4B is a timing diagram of the transmission of an erasure indicator bit on a power control sub-channel based on a frame received on the F-SCH. A received frame is processed and a determination is made whether the frame was received correctly or in error. In accordance with the cdma2000 standard, the frame can be 20, 40, or 80 msec in duration. Starting with the second 20 msec frame after the end of the received frame on the F-SCH, power control bits are sent on the power control sub-channel. Depending on the length of the frame on the F-SCH and the operating mode, 32, 16, or 8 power control bits are sent on the power control sub-channel, with the power control time duration corresponding to the frame length on the F-SCH. These bits are set to "1" for a bad frame and to "0" for a good frame.

In an embodiment, if FPC_MODE='101' or '110', the remote terminal sets the power control bits on the secondary power control sub-channel during a period equal to the frame length of the designated F-SCH to the erasure indicator bit. The erasure indicator bit is derived from the designated F-SCH (e.g., channel 0 or 1), and is defined as follows:

The remote terminal sets the erasure indicator bit to '0' for a period equal to the frame length of the designated F-SCH, starting at 20 msec after a detected good frame on that F-SCH, as shown in FIG. 4B.

Otherwise, the remote terminal sets the erasure indicator bit to '1' for a period equal to the frame length of the designated F-SCH, starting at 20 msec after a frame on that F-SCH, as shown in FIG. 4B.

Outer Power Control Loop (Setpoint Adjustment)

In an embodiment, for FPC_MODE='000', '001', and '010', the remote terminal supports an outer power control loop on two or more forward traffic channels assigned to the remote terminal (e.g., the F-FCH, F-DCCH, and F-SCH). The outer power control loop adjusts the setpoint for the channel to achieve the target FER. In an embodiment, for FPC_MODE='110', the remote terminal supports an outer power control loop on each of a number of forward traffic channels assigned to the remote terminal (e.g., the F-FCH and F-DCCH).

Referring back to FIG. 2, power control mechanism 200 can be maintained for each channel being power controlled. For the F-FCH, F-DCCH, or F-SCH being monitored, the setpoint for the channel can be adjusted to achieve the target FER or based on some other decoder statistics, or a combination thereof. The setpoint can be limited to within a range of values defined by a maximum setpoint and a minimum setpoint, which are typically set by a system operator through messaging from the base stations. The setpoint can thus be limited to the maximum setpoint if it exceeds this value, or to the minimum setpoint if it falls below this value.

Inner Power Control Loop (Power Control Commands)

In an embodiment, when FPC_MODE is equal to '000', '001', '010', or '110', the remote terminal supports a primary inner power control loop for the F-FCH or F-DCCH. The selected channel can be either the F-FCH or F-DCCH, depending on the parameter FPC_PRI_CHAN (e.g., FPC_PRI_CHAN='0' for the F-FCH, and FPC_PRI_CHAN='1' for the F-DCCH). When FPC_MODE is equal to '001' or '010', the remote terminal also supports a secondary inner power control loop for the designated F-SCH. The designated F-SCH can be either the first or second F-SCH, depending on whether the parameter FPC_SEC_CHAN is equal to '0' or '1', respectively.

For the inner power control loop of a selected forward channel, the remote terminal compares the signal quality (e.g., Eb/Nt) for the channel provided, generated by the inner power control loop, with the corresponding target setpoint for the channel, generated by the outer power control loop. The frame erasures and/or other decoder statistics on the selected channel can be used to determine the target setpoint. Also, the received signal quality of the selected forward channel can be determined based on measurements on a number of channels. For the primary inner power control loop, the received signal quality can be based on measurements of the forward pilot channel, the forward power control sub-channel, the F-FCH, some other channels, or a combination of these. And for the secondary inner power control loop, the received signal quality can be based on measurements for the F-SCH, the pilot channel from related base stations, some other channels, or a combination of these.

Based on the comparison of the received signal quality against the setpoint, a determination can be made whether there is enough transmit power on the selected forward channel relative to the setpoint. Power control commands ('0' or '1') can then be sent on the designated power control sub-channel to indicate whether more or less power than the current level is needed.

Figure 5:
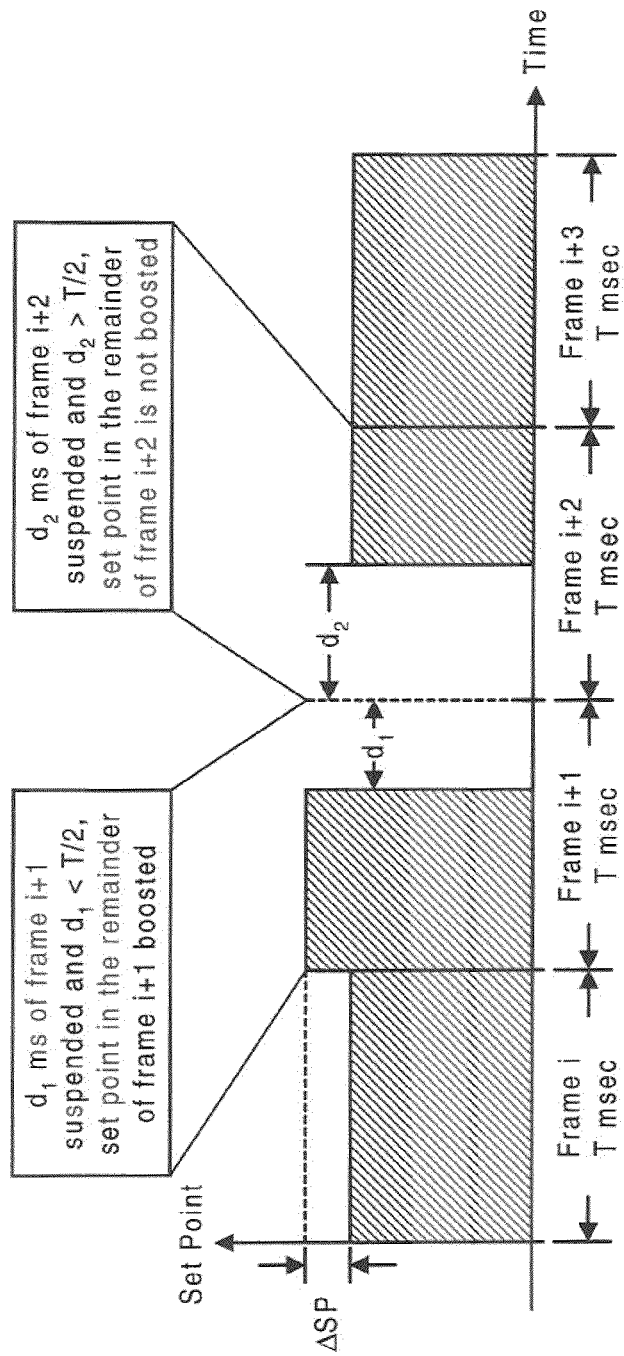
FIG. 5 is a block diagram of an adjustment of the setpoint to increase the likelihood of correctly receiving a partial frame.

FIG. 5 is a block diagram of an adjustment of the setpoint to increase the likelihood of correctly receiving a partial frame. The remote terminal may temporarily suspend its current processing of the forward traffic channel in order to tune to a candidate frequency (e.g., for possible hard handoff) and thereafter re-tune to the serving frequency. In an embodiment, if the remote terminal reception is suspended for d msec in a frame of length T msec, and if d is less than T/2, the remote terminal may temporarily increase its setpoint value by a particular amount ($\Delta SP$) for the remainder of the frame to increase the likelihood of correctly receiving the entire frame. The increase in setpoint ($\Delta SP$) may be selected as:

$$\Delta SP \leq 1 + 10\log\left(\frac{T}{T-d}\right). \quad \text{Eq (1)}$$

At the beginning of the next frame, the use of the original setpoint may be resumed. Other criteria for determining whether to increase the setpoint and other setpoint increase values can also be used and are within the scope of the invention.

Figure 6:
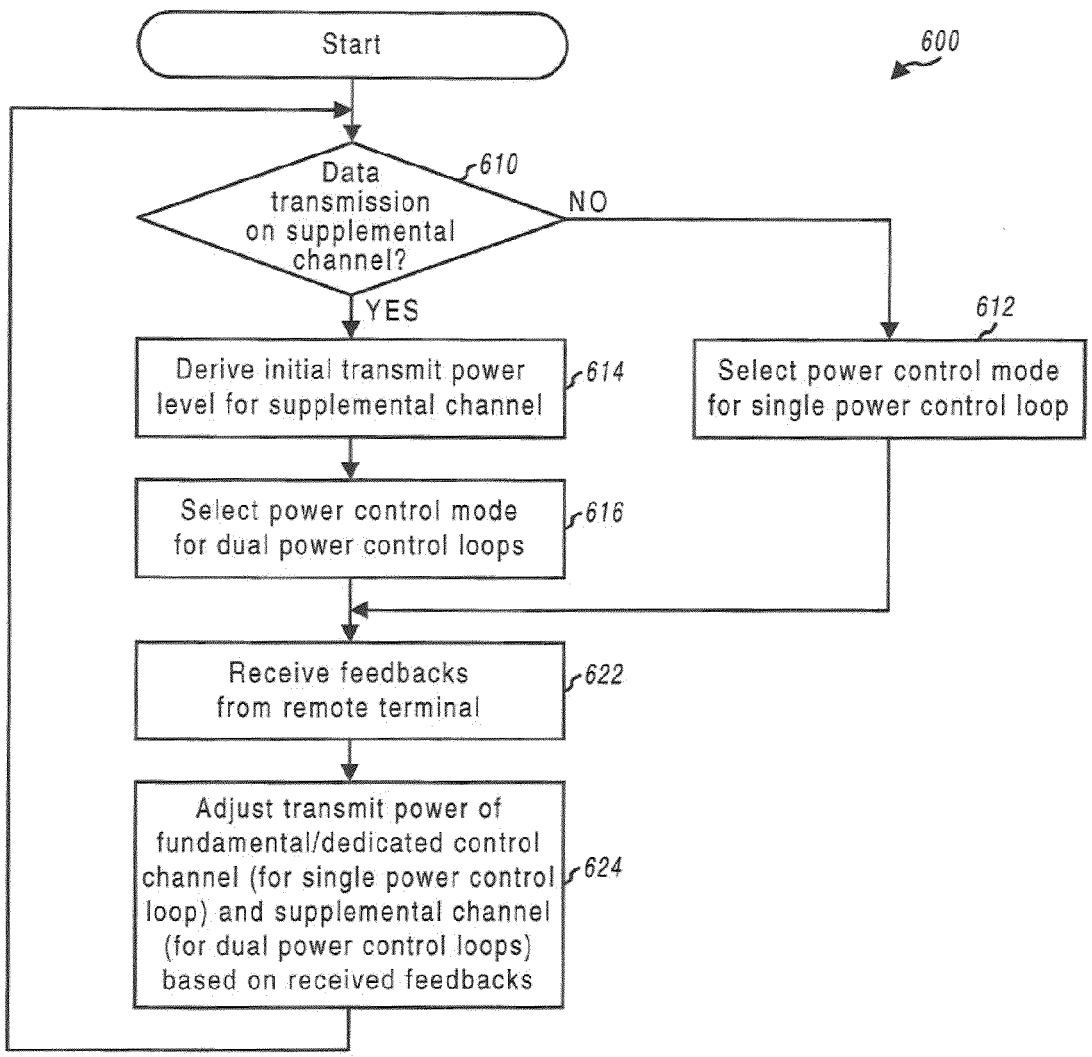
FIG. 6 is a flow diagram of a power control process maintained at a base station in accordance with an embodiment of the invention.

FIG. 6 is a flow diagram of a power control process 600 maintained at a base station in accordance with an embodiment of the invention, whereby the F-FCH is used as an example. It should be understood that the F-DCCH or other channels are equally applicable in the following description. Power control process 600 is maintained for each remote terminal in communication with the base station. At step 610, a determination is made whether data is being transmitted on an F-SCH to the remote terminal. At the start of a communication session with the remote terminal, only the F-FCH may be assigned. Thus, initially, the answer is no at step 610, and the process proceeds to step 612 where the base station selects a power control mode for a single power control loop. Referring to Table 1, the base station may select, for example, FPC_MODE='000' in which the 800 bps feedback is used exclusively to control the F-FCH or F-DCCH. The selected mode is signaled to the remote terminal and the process proceeds to step 622.

Back at step 610, if there is data to send on the F-SCH to the remote terminal, the base station derives an initial transmit power level to be used for the F-SCH, at step 614. The initial transmit power level can be based on a number of factors such as, for example, (1) the current transmit power level (and possibly the recent history of this level) for the F-FCH/F-DCCH (i.e., the selected forward channel), (2) the data rates on the F-FCH/F-DCCH and F-SCH, (3) the frame lengths (e.g., 5, 20, 40, or 80 msec) on the F-FCH/F-DCCH and F-SCH, (4) the coding types (e.g., convolutional or Turbo coding) and code rate (e.g., 1/4, 1/2, or some other rate) on the F-FCH/F-DCCH and F-SCH, (5) the difference in the active set between the F-FCH/F-DCCH and F-SCH, (6) the difference between the current activity factor from which (1) is derived and the expected activity factors for the F-FCH/F-DCCH and F-SCH, and (7) other factors.

The determination of the initial transmit power is described in further detail in U.S. patent application Ser. No. 09/675,706, entitled "METHOD AND APPARATUS FOR DETERMINING AVAILABLE TRANSMIT POWER IN A WIRELESS COMMUNICATION SYSTEM," filed Sep. 29, 2000, assigned to the assignee of the invention and incorporated herein by reference.

Once transmission starts on an F-SCH, the base station selects a power control mode that supports two power control loops (or delta power control), at step 616. For example, the base station may select FPC_MODE='110' which supports a 400 bps sub-channel for the up/down feedback on the F-FCH/F-DCCH and a 50 bps sub-channel for erasure indications on the F-SCH. Other FPC_MODEs may also be selected by the base station such as modes '001', '010', or '101' shown in Table 1. The selected mode is signaled to the remote terminal.

Thereafter, the base station receives feedbacks from the remote terminal, at step 622. Depending on the selected power control mode, the received feedbacks may comprise power control commands (e.g., up/down commands), erasure indicator bits, or quality indicator bits for each power control sub-channel. If a single-loop power control mode is selected, the base station adjusts the transmit power of either the F-FCH or F-DCCH based on the feedback received on the primary power control sub-channel, at step 624. Alternatively, if a dual-loop power control mode is selected, the base station further adjusts the transmit power of the designated F-SCH (e.g., 0 or 1) based on the feedbacks received on the secondary power control sub-channel, also at step 624. The process then returns to step 610 and the transmissions on the forward channels are monitored and another power control mode may be selected.

Power Control Mechanisms

As noted above, various power control mechanisms can be implemented based on the supported power control modes to adjust the transmit power of the F-FCH/F-DCCH and the F-SCH. These power control mechanisms operate based on the feedbacks received on the primary and second power control sub-channels. Some of these power control mechanisms are briefly described below.

In a first power control mechanism, the base station adjusts the transmit power of the F-FCH/F-DCCH based on the feedback received from the primary power control sub-channel and further adjusts the transmit power of the F-SCH based on the feedback received from the secondary power control sub-channel. Various power control modes may be used in conjunction with the first power control mechanism, including modes '001', '010', '101' and '110'. For example, for power control mode '110', the transmit power of the F-FCH (or F-DCCH) can be adjusted up to 400 times per second with the primary power control sub-channel and the transmit power of the F-SCH can be adjusted at 50/25/12.5 times per second with the secondary power control sub-channel.

In a second power control mechanism (which is also referred to herein as a delta power control mechanism), the base station adjusts the transmit power of the F-FCH/F-DCCH and the F-SCH together based on the feedback received from one power control sub-channel, and further adjusts the difference in transmit power (i.e., power delta) of the F-FCH/F-DCCH and F-SCH based on the feedback received via a second means. The feedback for the power delta can be received via the secondary power control sub-channel or via messaging between the mobile station and base station (e.g., an Outer Loop Report Message or a Power Strength Measurement Message). The power delta may be a particular percentage of the transmit power from the base station, or some other measure.

In a first implementation of the second power control mechanism, which may utilize power control mode '110' in Table 1, the transmit power of the F-FCH/F-DCCH and that of the F-SCH are both adjusted together at up to 400 times a second based on the 400 bps feedback received on the primary power control sub-channel. This feedback may be derived from the F-FCH (or F-DCCH). The base station may be operated to act only on the reliable feedback (which effectively reduces the feedback rate if there are unreliable feedback), and may further adjust the transmit power based on other information such as, for example, power control information from other base stations in soft handoff with the remote terminal. Thus, the adjustment frequency may vary. In this implementation, the power delta can be adjusted at up to 50 times a second based on the 50 bps feedback received on the secondary power control sub-channel. This feedback may be derived from the F-SCH. The transmit power of the F-SCH may thus be (effectively) independently adjusted up to 50 times a second based on the 50 bps feedback.

In a second implementation of the second power control mechanism, which may also utilize power control mode '110' in Table 1, the slower feedback is set at a particular rate based on the frame rate on the F-SCH. For example, the 400 bps allocated for the slower feedback may be aggregated into 50, 25, or 12.5 bps for frame rates of 20, 40, or 80 msec, respectively.

In a third implementation of the second power control mechanism, the base station adjusts the transmit power of the F-FCH (or F-DCCH) based on the feedback received on the power control sub-channel, and the transmit power of the F-SCH can be tied to that of the F-FCH. The power delta between the F-FCH (or F-DCCH) and the F-SCH can be adjusted, for example, by use of messaging via, for example, the Outer Loop Report Message or the Power Strength Measurement Message.

In a third power control mechanism, the slower feedback is used to indicate a number of metrics for the F-SCH, one of which may be the erasures on the F-SCH. For example, when the F-SCH is operated in 40 msec mode (i.e., the frame rate is 40 msec), a 50 bps erasure indicator may be sent along with a 50 bps indication to show whether there is more than enough received power for the remote terminal to decode the F-SCH when there is no erasure. The second indication allows the base station to reduce the transmit power of the F-SCH if sufficient margin exists. And when there is erasure on the F-SCH, the second 50 bps may be used, for example, to indicate whether the base station needs to increase the transmit power by a large or small step. Alternatively, the second 50 bps sub-channel can be used to indicate the erasures on a second F-SCH. The number of bits aggregated for the erasure indicator is reduced when a second indicator is being sent on the power control sub-channel.

In a fourth power control mechanism, the transmit power level of the F-SCH is adjusted based on the received feedback on one power control sub-channel, and the F-FCH/F-DCCH is transmitted at a particular delta relative to the transmit power level of the F-SCH. In this embodiment, the 800 bps feedback is aggregated into a single slower channel to support the feedback for the F-SCH. For example, the 800 bps feedback may be aggregated into 50, 25, or 12.5 bps depending on the length of the frame on the F-SCH. Power control modes '000', '011', '100', or some other may be used to implement this power control mechanism.

Operating Modes

The power control mechanisms described above provide different power control characteristics, and each may be better suited for a particular set of operating conditions. Thus, the particular power control mechanism selected for use may be dependent on various factors such as, for example (1) whether the F-FCH/F-DCCH and F-SCH are being transmitted from the same set of base stations (i.e., full active set for the F-SCH), (2) whether the F-SCH is transmitted at a fixed or variable data rate, and some other factors. Some sets of operating conditions and the applicable power control mechanisms are described below.

Similar Operating Conditions

If the F-FCH (or F-DCCH) and the F-SCH are operated under similar conditions, the fading on the two channels is similar and their transmit power may be similarly adjusted. Similar operating conditions may occur if the mobile station is not in soft handoff or when the F-FCH (or F-DCCH) and the F-SCH are transmitted by the same set of base stations (i.e., the channels have identical active sets) in soft handoff. For this scenario, various power control modes can be used as follows:

- With power control mode '000', the 800 bps feedback on the F-FCH (or F-DCCH) can be used to adjust the transmit power of that channel, and the transmit power of the F-SCH can be "ganged" with that of the F-FCH/F-DCCH. The power delta between the F-FCH/F-DCCH and the F-SCH can be adjusted by messaging, as described above.

- Power control modes '001' and '010' can also be used similar to that described above for mode '000'. However, the transmit power level for the F-SCH can be power-controlled independently of the F-FCH/F-DCCH. For the independent power control, the mobile station measures the signal quality of the F-SCH directly. When the data rate on the F-SCH is low (e.g., 1500 bps) the accuracy of the signal quality measurements may be insufficient, which may result in degradation in the power control of the F-SCH. Also, if the transmission on the F-SCH is not continuous (i.e., bursty) the setpoint for the F-SCH may become outdated during pauses in the transmission, and becomes less effective when the transmission resumes.

- With power control modes '011' and '100', the erasure and quality indicator bits, respectively, can be used to adjust the transmit power of the F-FCH (or F-DCCH). However, the feedback is less frequent and with longer delays. The transmit power of the F-SCH can be adjusted via messaging.

- With power control mode '101', the transmit power of the F-FCH/F-DCCH and F-SCH can be independently adjusted.

- Power control mode '110' supports the delta power control mechanism described above and a dual-loop control. The 400 feedback can be used to adjust the transmit power of the F-FCH/F-DCCH and the slower feedback can be used to adjust the power delta or the transmit power of the F-SCH. This mode provides reduced feedback delays than with the messaging described above.

Full Active Set with Variable-Rate F-SCH

If the F-FCH and the F-SCH are operated with the same active set in soft handoff (i.e., the same base stations transmit on both channels) but the data rate on the F-SCH is variable, then various power control modes can be used as follows:

- Power control mode '000' can be used as described above. However, it may be difficult to accurately adjust the transmit power of the F-SCH for each data rate since the erasure information sent via messaging is typically not matched to the actual data rate.
- Power control modes '001' are '010' are typically not used since the mobile station is typically not able to detect the data rate on the F-SCH in time to send information back on the power control sub-channel.
- Power control modes '011' and '100' can be used in a similar manner as that described above, albeit with a slower feedback rate.
- Power control mode '101' can be used to implement two power control loops using the two power control sub-channels. An additional advantage provided by mode '101' is that the erasure indicator bit provides individual feedback on the different F-SCH data rates, so the base station may be able to adjust the transmit power with a higher degree of accuracy.
- Power control mode '110' can also be used to implement two power control loops using the two power control sub-channels. The transmit power of the F-FCH and F-SCH can be adjusted independently via two power control loops. Alternatively, mode '110' can also be used to implement the delta power control mode whereby the transmit power of the F-FCH and F-SCH is adjusted together by the 400 bps feedback while the power delta is adjusted by the slower feedback.

Reduce Active Set with Fixed-Rate F-SCH

If the F-SCH is operated with a reduced active set when the F-FCH/F-DCCH is in soft handoff (i.e., fewer base stations transmit on the F-SCH than the F-FCH or F-DCCH) and the data rate on the F-SCH is fixed, then various power control modes can be used as follows:

- Power control modes '000', '011', and '100' are not as effective in this scenario since the fading on the two channels is likely to be different due to the two different active sets and no feedback is provided for the F-SCH.
- Power control modes '001' and '010' may be used, but may not be effective if the data rate on the F-SCH is low or if the transmission on the F-SCH is bursty.
- Power control modes '101' and '110' can be used to implement two power control loops using the two feedback sub-channels, which will likely provide improved performance over the delta power control mode because of the fading difference.

Reduce Active Set with Variable-Rate F-SCH

If the F-SCH is operated with a reduced active set from that for the F-FCH or F-DCCH and the data rate on the F-SCH is variable, then various power control modes can be used as follows:

- Power control modes '101' and '110' can be used to implement two independent (i.e., independent adjustment of F-FCH/F-DCCH and F-SCH) or linked (i.e., delta power control) power control loops using the two feedback sub-channels, which will likely provide improved performance over the delta power control mode because of the fading difference. Also, the erasure indicator bit provides individual feedback on the different F-SCH data rates. This is because the base station can use its knowledge of the feedback delay to match the EIBs with the transmitted data rates on the F-SCH.

Figure 7:
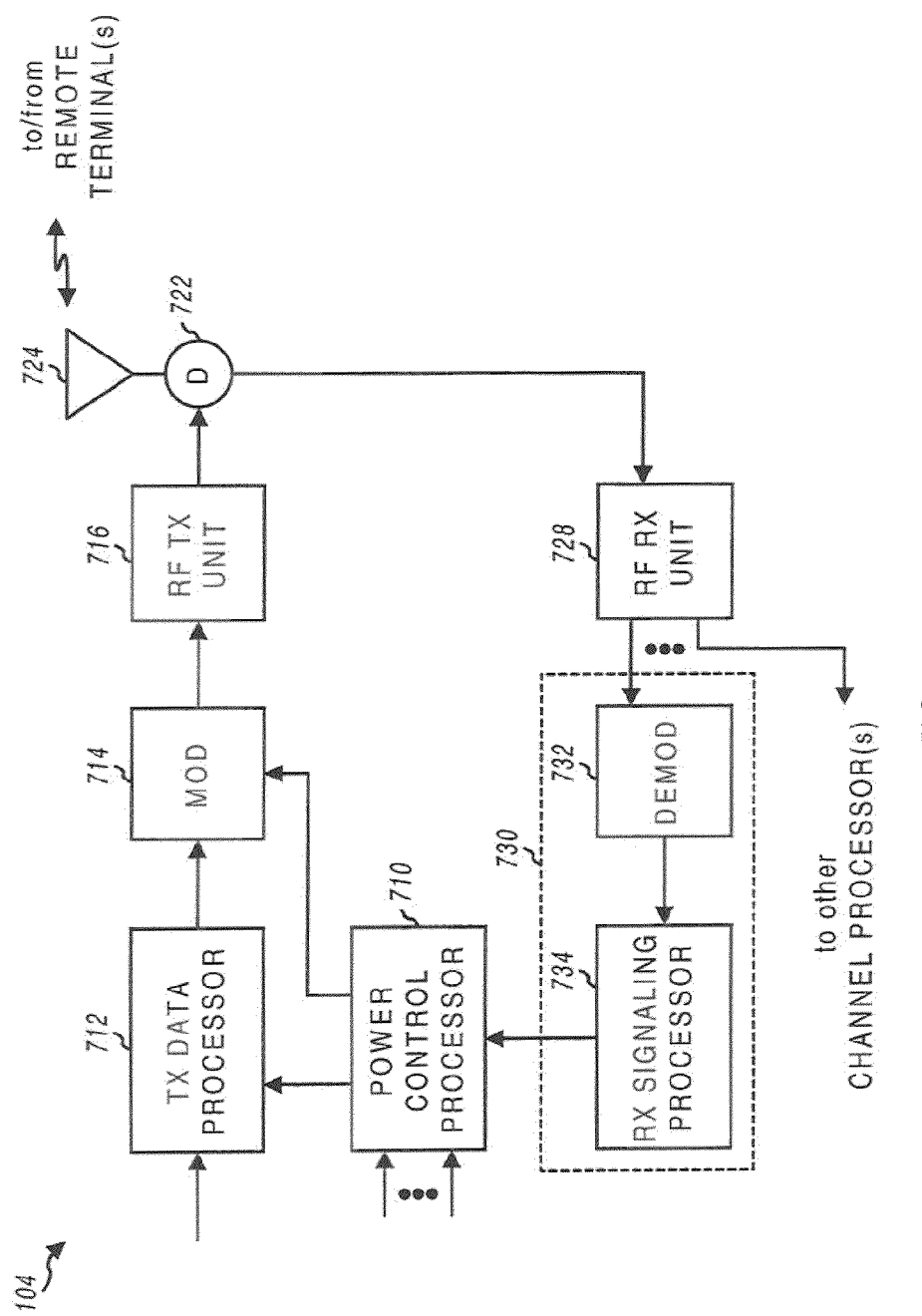
FIGS. 7 and 8 are block diagrams of an embodiment of the base station and remote terminal, respectively, which are capable of implementing some aspects and embodiments of the invention.

FIG. 7 is a block diagram of an embodiment of base station 104, which is capable of implementing some aspects and embodiments of the invention. On the forward link, data is received and processed (e.g., formatted, encoded) by a transmit (TX) data processor 712. The processed data is then provided to a modulator (MOD) 714 and further processed (e.g., covered with a cover code, spread with short PN sequences, scrambled with a long PN sequence assigned to the recipient remote terminal, and so on). The modulated data is then provided to an RF TX unit 716 and conditioned (e.g., converted to one or more analog signals, amplified, filtered, quadrature modulated, and so on) to generate a forward link signal. The forward link signal is routed through a duplexer (D) 722 and transmitted via an antenna 724 to the remote terminal(s).

Although not shown in FIG. 7 for simplicity, base station 104 is capable of processing and transmitting data on one or more forward channels (e.g., the F-FCH and one or more F-SCHs) to a particular mobile station. The processing (e.g., encoding, covering, and so on) for each forward channel may be different from that of other channel(s).

Figure 8:
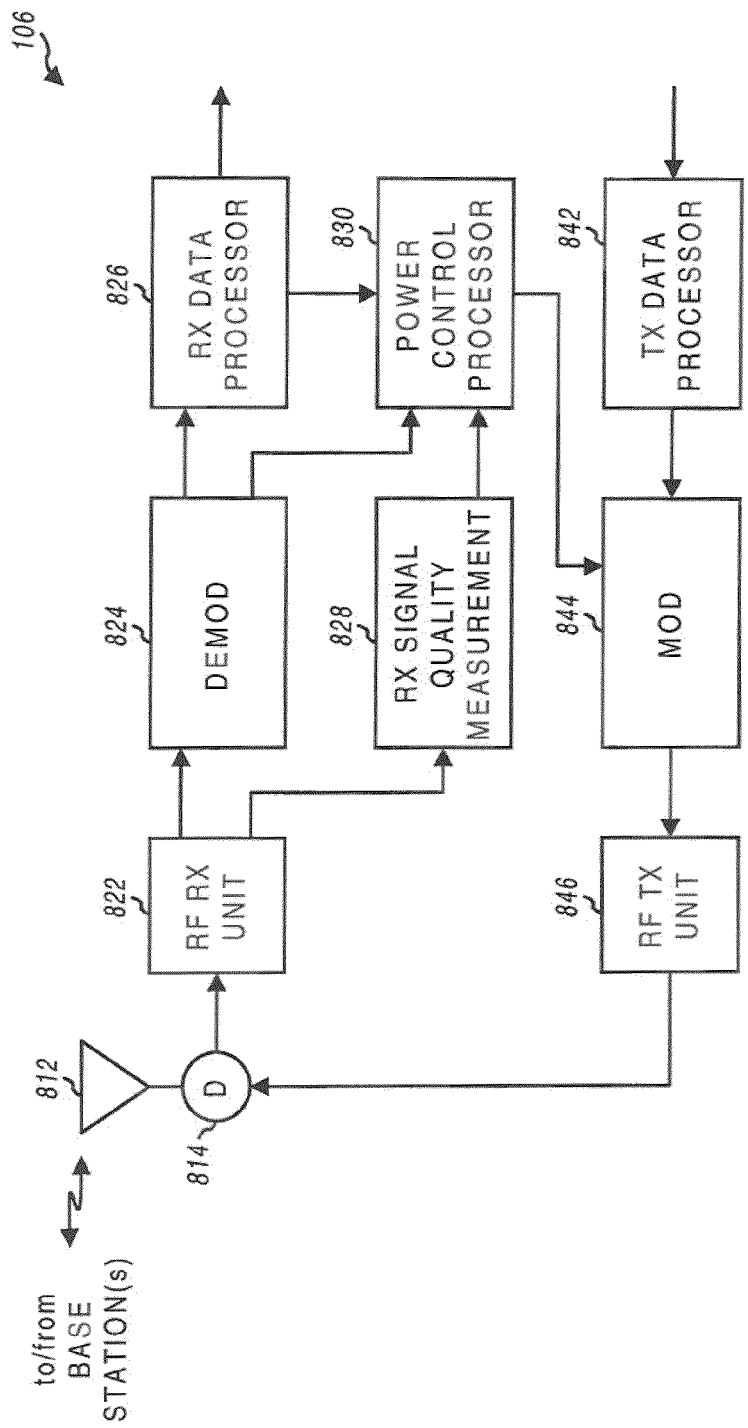

FIG. 8 is a block diagram of an embodiment of remote terminal 106. The forward link signal is received by an antenna 812, routed through a duplexer 814, and provided to an RF receiver unit 822. RF receiver unit 822 conditions (e.g., filters, amplifies, downconverts, and digitizes) the received signal and provides samples. A demodulator 824 receives and processes (e.g., despreads, decovers, and pilot demodulates) the samples to provide recovered symbols. Demodulator 824 may implement a rake receiver that processes multiple instances of the received signal and generates combined recovered symbols. A receive data processor 826 then decodes the recovered symbols, checks the received frames, and provides the output data. Demodulator 824 and receive data processor 826 may be operated to process multiple transmissions received via multiple channels.

For forward link power control, the samples from RF receiver unit 822 may also be provided to an RX signal quality measurement circuitry 828 that measures the quality of at least one received transmission (e.g., the transmission on the F-FCH). The signal quality measurement can be achieved using various techniques, including those described in the aforementioned U.S. Pat. Nos. 5,056,109 and 5,265,119. The measured signal quality is provided to a power control processor 830, which compares the measured signal quality to the setpoint of the channel being processed, and sends a proper responsive power control command (e.g., UP or DOWN) on a power control sub-channel via the reverse link to the base station.

Power control processor 830 may also receive other metrics for other channels being processed. For example, power control processor 830 may receive erasure indicator bits from receive data processor 826 for a transmission on a F-SCH. For each frame period, receive data processor 826 may provide to power control processor 830 an indication whether the received frame is good or bad, or that no frame was received. Power control processor 830 may receive quality indicator bits from demodulator 824, or some other metrics from demodulator 824 and/or receive data processor 826. Power control processor 830 then sends the received power control information on another power control sub-channel via the reverse link to the base station.

On the reverse link, data is processed (e.g., formatted, encoded) by a transmit (TX) data processor 842, further processed (e.g., covered, spread) by a modulator (MOD) 844, and conditioned (e.g., converted to analog signals, amplified, filtered, quadrature modulated, and so on) by an RF TX unit 846 to generate a reverse link signal. The power control information from power control processor 830 may be multiplexed with the processed data within modulator 844. The reverse link signal is routed through duplexer 814 and transmitted via antenna 812 to one or more base stations 104.

Referring back to FIG. 7, the reverse link signal is received by antenna 724, routed through duplexer 722, and provided to an RF receiver unit 728. RF receiver unit 728 conditions (e.g., downconverts, filters, and amplifies) the received signal and provides a conditioned reverse link signal for each remote terminal being received. A channel processor 730 receives and processes the conditioned signal for one remote terminal to recover the transmitted data and power control information. A power control processor 710 receives the power control information (e.g., any combination of power control commands, erasure indicator bits, and quality indicator bits) and generates one or more signals used to adjust the transmit power of one or more transmissions to the mobile station.

Back in FIG. 8, power control processor 830 implements part of the inner and outer loops described above. For the inner loop, power control processor 830 receives the measured signal quality and sends a sequence of power control commands, which can be sent via a power control sub-channel on the reverse link. For the outer loop, power control processor 830 receives the indication of good, bad, or no frame from data processor 826 and adjusts the setpoint for the remote terminal accordingly. In FIG. 7, power control processor 710 also implements part of the power control loops described above. Power control processor 710 receives the power control information on the power control sub-channel(s) and accordingly adjusts the transmit power of one or more transmissions to the mobile station.

The power control of the invention can be implemented by various means. For example, power control can be implemented with hardware, software, or a combination thereof. For a hardware implementation, the elements in the power control can be implemented within one or more application specific integrated circuits (ASICs), digital signal processors (DSPs), programmable logic devices (PLDs), controllers, micro-controllers, microprocessors, other electronic units designed to perform the functions described herein, or a combination thereof.

For a software implementation, the elements in the power control can be implemented with modules (e.g., procedures, functions, and so on) that perform the functions described herein. The software code can be stored in a memory unit and executed by a processor (e.g., transmit power control processor 710 or 830).

Although various aspects, embodiments, and features of the power control of the invention have been described for the forward link, some of these power control techniques can be advantageously applied for the reverse link power control. For example, the power control for the reverse link can be designed to control the transmit power of a number of concurrent transmissions.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A method for adjusting transmit power levels of a plurality of transmissions in a wireless communication system, the method comprising:
    receiving a first indication of a received quality of a first transmission;
    adjusting the transmit power level of the first transmission based at least in part on the first indication;
    receiving a second indication of a received quality of a second transmission, wherein the second indication is formed by aggregating at a transmitter a portion of an allocation of a plurality of bits allocated to a sub-channel for feedback as the second indication for the second transmission, the second indication including an indicator separate from any power control commands; and
    adjusting the transmit power level of the second transmission based at least in part on the second indication.

2. The method of claim 1, wherein the first indication comprises a power control command that indicates whether to increase or decrease the transmit power level of the first transmission.

3. The method of claim 2, wherein the transmit power levels of the first and second transmissions are adjusted together based on the power control command.

4. The method of claim 3, wherein a difference between the transmit power levels of the first and second transmissions is adjusted based on the second indication.

5. The method of claim 2, wherein the power control command is generated based on a comparison of the received quality of the first transmission against a setpoint.

6. The method of claim 1, wherein the transmit power levels for the first and second transmissions are adjusted based solely on the first and second indications, respectively.

7. The method of claim 1, wherein second indication comprises an erasure indicator bit indicating whether a frame in the second transmission was received correctly or in error.

8. The method of claim 1, wherein second indication comprises a quality indicator bit indicating the quality of a received frame in the second transmission.

9. The method of claim 1, further comprising:
    receiving a third indication of a received quality of a third transmission, wherein the third indication is formed by aggregating a plurality of bits allocated for feedback for the third transmission; and
    adjusting the transmit power level of the third transmission based at least in part on the third indication.

10. The method of claim 1, wherein the first indication is received via a first power control sub-channel and the second indication is received via a second power control sub-channel.

11. The method of claim 10, wherein the first and second power control sub-channels are formed by time division multiplexing a power control channel.

12. The method of claim 10, wherein a combined bit rate of the first and second power control sub-channels is limited to a particular bit rate.

13. The method of claim 10, wherein bits allocated for the second power control sub-channel are aggregated to form the feedback for the second transmission at a lower rate but having increased reliability.

14. The method of claim 13, wherein the feedback rate of the second transmission is based at least in part on a frame size of the second transmission.

15. The method of claim 13, wherein the feedback rate of the second transmission is selectable from among a set of possible feedback rates.

16. The method of claim 10, wherein the second power control sub-channel is operative to send a plurality of metrics for the second transmission.

17. The method of claim 16, wherein one of the plurality of metrics indicates a step size for adjustment of the transmit power level for the second transmission.

18. The method of claim 16, wherein one of the plurality of metrics is indicative of an amount of margin in the received quality of the second transmission for no frame erasure.

19. The method of claim 1, wherein the wireless communication system is a CDMA system that conforms to cdma2000 standard or W-CDMA standard, or both.

20. A method for adjusting transmit power levels of a plurality of transmissions in a wireless communication system, the method comprising:
receiving and processing a first transmission to determine a received quality of the first transmission;
forming a first indication for the received quality of the first transmission;
receiving and processing a second transmission to determine a received quality of the second transmission;
forming a second indication for the received quality of the second transmission; and
sending the first and second indications via first and second power control sub-channels, respectively, and
wherein the second indication is formed by aggregating at a transmitter a portion of an allocation of a plurality of bits allocated to a sub-channel for feedback as the second indication for the second transmission, the second indication including an indicator separate from any power control commands.

21. The method of claim 20, further comprising:
determining a duration of an interruption in the receiving and processing of the first transmission; and
signaling for an increase in the transmit power level for the first transmission if the duration of the interruption is less than a particular time period.

22. The method of claim 21, wherein the signaling is performed if the duration of the interruption is less than or equal to half a period of a frame in the first transmission.

23. The method of claim 21, wherein an amount of increase in the transmit power level for the first transmission is based on the duration of the interruption and the period of a frame in the first transmission.

24. A power control unit for use in a wireless communication system, comprising:
a signal quality measurement unit operative to receive and process a first transmission to provide a first indication for a first metric for the first transmission;
a data processor operative to receive and process a second transmission to provide a second indication for a second metric for the second transmission;
a power control processor coupled to the signal quality measurement unit and the data processor, the power control processor operative to direct transmission of the first and second indications on first and second power control sub-channels, respectively, and
wherein the second indication is formed by aggregating at a transmitter a portion of an allocation of a plurality of bits allocated to a sub-channel for feedback as the second indication for the second transmission, the second indication including an indicator separate from any power control commands.

25. A power control unit within a base station in a wireless communication system, comprising:
a channel processor operative to receive and process a received signal to recover a first indication of a received quality of a first transmission and a second indication of a received quality of a second transmission, wherein the second indication is formed by aggregating at a transmitter a portion of an allocation of a plurality of bits allocated to a sub-channel for feedback as the second indication for the second transmission, the second indication including an indicator separate from any power control commands; and
a power control processor coupled to the channel processor and operative to receive the first and second indications and provide one or more commands to adjust transmit power levels of the first and second transmissions.

* * * * *